US006771749B1

United States Patent
Bansal et al.

(10) Patent No.: US 6,771,749 B1
(45) Date of Patent: Aug. 3, 2004

(54) METHOD AND APPARATUS FOR DELIVERING MESSAGES TO A DEVICE

(75) Inventors: Pradeep K. Bansal, Dayton, NJ (US); Lee Begeja, Gillette, NJ (US)

(73) Assignee: A.T.&T. Corp., New York, NY (US)

( * ) Notice: Subject to any disclaimer, the term of this patent is extended or adjusted under 35 U.S.C. 154(b) by 0 days.

(21) Appl. No.: 09/360,882

(22) Filed: Jul. 23, 1999

(51) Int. Cl.$^7$ ................................................ H04M 1/64
(52) U.S. Cl. ................ 379/88.17; 379/67.1; 379/88.12; 379/88.13; 379/88.18; 379/88.22; 379/88.25
(58) Field of Search ............................ 379/67.1, 88.12, 379/88.13, 88.14, 88.17, 88.18, 88.22, 88.23, 88.24, 88.25, 905, 908; 455/412, 413, 466

(56) References Cited

U.S. PATENT DOCUMENTS

| | | | | |
|---|---|---|---|---|
| 5,412,375 A | * | 5/1995 | Wood | 340/825.03 |
| 5,444,768 A | * | 8/1995 | Lemaire et al. | 379/68 |
| 5,631,745 A | * | 5/1997 | Wong et al. | 358/434 |
| 5,822,405 A | * | 10/1998 | Astarabadi | 379/88 |
| 5,845,255 A | * | 12/1998 | Mayaud | 705/3 |
| 5,896,444 A | * | 4/1999 | Perlman et al. | 379/93.35 |
| 5,933,816 A | * | 8/1999 | Zennah et al. | 705/35 |
| 5,966,663 A | * | 10/1999 | Gleason | 455/466 |
| 6,122,639 A | * | 9/2000 | Babu et al. | 707/103 |
| 6,167,253 A | * | 12/2000 | Farris et al. | 455/412 |
| 6,203,192 B1 | * | 3/2001 | Fortman | 379/88.14 |
| 6,317,594 B1 | * | 11/2001 | Gossman et al. | 455/414 |
| 6,353,661 B1 | * | 3/2002 | Bailey, III | 379/93.25 |

FOREIGN PATENT DOCUMENTS

| | | |
|---|---|---|
| EP | 0822728 | 2/1998 |
| WO | WO 9720442 | 6/1997 |
| WO | WO 9856195 | 12/1998 |
| WO | WO 9937070 | 7/1999 |

* cited by examiner

Primary Examiner—Allan Hoosain

(57) ABSTRACT

A method and apparatus for sending messages to a portable device. The apparatus broadcasts query signals and receives an identification code from a portable device as a reply. The identification code can identify a portable device user, user preferences and portable device capabilities. Messages of various formats are retrieved from local and/or remote messaging systems based on the identification code. The apparatus can send the retrieved messages to the portable device and receive messages from the portable device.

27 Claims, 7 Drawing Sheets

| | 300 | 310 | 320 | 330 | 340 | |
|---|---|---|---|---|---|---|
| | IDENTIFICATION CODE | USER INFORMATION | VOICE MAIL MESSAGES | E-MAIL MESSAGES | FAX MESSAGES | |
| | 100001 | SMITH, JOHN 667 ROAD PDA ⋮ | 1... 2... | NONE | NONE | |
| | JDOE | DOE, JOHN 22 AVENUE LAPTOP ⋮ | NONE | NONE | 1... | |
| | 891011 | DAVIDSON, BILL 1200 DRIVE PDA ⋮ | 1... 2... 3... 4... | 1... 2... | NONE | |
| | | | | | | |

METHOD AND APPARATUS FOR DELIVERING MESSAGES TO A DEVICE

BACKGROUND OF THE INVENTION

1. Field of Invention

The present invention is directed to a method and apparatus for sending and receiving messages to and from users of a messaging system.

2. Description of Related Art

Presently, users of messaging systems can receive messages in a variety of formats at a number of different locations. Messages in e-mail, voice mail, fax, etc., formats may be received at home, office, hotels, for example. However, users have to access messages of different formats from different systems in order to receive all of their messages. For example, the user must access voice mail messages using an answering machine and then access electronic mail messages via a computer. Users are also inconvenienced by having to periodically check each of their messaging devices to receive their messages. Thus, there is a need for new technology to deliver messages.

SUMMARY OF THE INVENTION

The invention provides an apparatus and method for the automatic retrieval of messages of varying formats to a user's portable device. When within range of a detector, the portable device sends to the detector an identification code which is then forwarded to a messaging system. The identification code identifies the user and capabilities of the portable device. The messaging system retrieves messages based on the identification code and the device capabilities. The messaging system then sends the retrieved messages to the portable device.

The user does not have to access messaging devices separately to retrieve messages of different formats. The messaging system of the invention compiles messages of a variety of formats and sorts the messages to send them to a portable device depending on the user's preferences.

The portable device can be automatically detected when it comes within range of a detecter. Therefore, the user does not have to execute lengthy login sequences to obtain personal messages.

The method and apparatus can automatically detect a portable device, combine various formats of messages, sort out different formats of messages for different user portable devices, and receive and send messages to and from various locations. The method and apparatus also allows portable devices to send messages to each other directly.

BRIEF DESCRIPTION OF THE DRAWINGS

The preferred embodiments of the present invention will be described with reference to the following figures, wherein like numerals designate like elements, and wherein:

FIG. 3 is an example data structure of the database of FIG. 1;

DETAILED DESCRIPTION OF PREFERRED EMBODIMENTS

Figure 1:
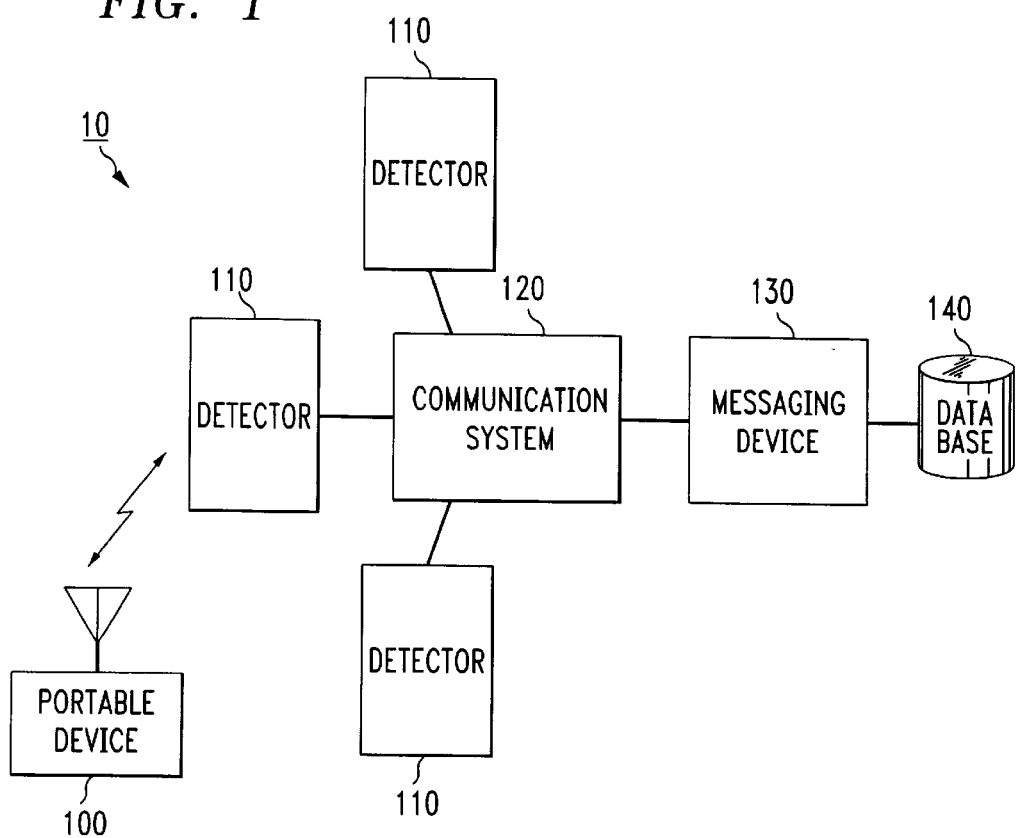
FIG. 1 is an exemplary block diagram of a system according to a first embodiment.

FIG. 1 is an exemplary block diagram of a messaging system 10 that includes at least one portable device 100, one or more detectors 110, a communication system 120, a messaging device 130 and a database 140.

The portable device 100 may be any portable communication device such as a portable digital assistant (PDA), a laptop or a portable computer, a cellular telephone, a pager or any other device that can receive and send communication signals. The portable device 100 is assigned an identifier which may include, for example, a mobile identification number (MIN), telephone number, device address, or any other type of numeric or alphanumeric device identifier appropriate for the device. The identifier may also include fixed or programmable serial numbers or fixed or programmable ID numbers.

The portable device 100 may have the capability of recording and storing a user's messages that are to be sent to the messaging device 130 and forwarded to other messaging systems. The portable device 100 can store user's messages until the portable device 100 is in range of a detector 110.

The detector 110 may be wireless or hard-wired to the communication system 120. The detector 110 may be any transceiver which is capable of sending and receiving communication signals. The detector 110 can transmit query signals requesting portable devices 100 that receive the query signal to respond with their device identifier. When a person having a portable device 100 comes within range of a detector 110, the portable device 100 receives the identification request from the detector 110 and responds by sending a signal to the detector 110 which provides an identification code of the portable device 100. The identification code received by the detector 110 is sent across communication system 120 to the messaging device 130.

Alternatively, the messaging system 10 may be configured so that the portable device 100 transmits a query signal. In this case, when the portable device 100 is within range of the detector 110, the detector 110 receives the query signal and the messaging system 10 responds with a reply signal. When the portable device 100 receives the reply signal, the portable device transmits a signal to the detector 110 which provides an identification code of the portable device 100. The portable device 100 may be configured to transmit the query signal in various ways. The portable device 100 may have a button that is depressed to trigger the transmission of the query signal, the query signal may be transmitted automatically and/or continuously, and the like. The portable device 100 may also send the query signal upon power-up of the portable device 100, i.e. when the portable device 100 is turned on. In short, any method for transmitting a query signal may be used by the portable device 100 without departing from the spirit and scope of this invention.

The communication system 120 may be a stand-alone device, an incorporated device or may include one or more wireless or wired networks. The communication system 120 may include any type of network that is capable of sending and receiving communication signals. For example, the communication system 120 may include a data network, such as the Internet, an intranet, a local area network (LAN), a wide area network (WAN), and other like communication systems. The communication system 120 may also include a telecommunications network, such as a local telephone network, long distance telephone network, cellular telephone network, satellite communications network, and other like communication systems. Furthermore, the communication system 120 may include more than one network and may include a plurality of different types of networks. Thus, the communication system 120 may include a plurality of data networks, a plurality of telecommunications networks, a combination of data and telecommunications networks, and other like communication systems.

The messaging device 130 retrieves information from the database 140 corresponding to the identification code received from the communication system 120. The database 140 does not need to be separate from the messaging device 130 and can be integrated into the messaging device 130. The messaging device 130 can contain all relative messages for the user of a portable device 100 or the messaging device 130 can communicate with other messaging devices 130 to obtain messages for the user of portable device 100. For example, the messaging device 130 can have a fast connection to the Internet. The messaging system 10 can then generate a log-in sequence to the user's e-mail account and download messages for transmission to the portable device 100. Additionally, messaging device 130 may be programmed with a code sequence for an existing voice mail account to enable the messaging system 10 to download voice mail messages.

Furthermore, the messaging device 130 can be used with an integrated message providing system. The integrated message providing system may have the ability to send, receive and store various types of messages. For example, the integrated message providing system may compile a database containing voice mail, e-mail and fax messages to be sent to the portable device.

Figure 2:
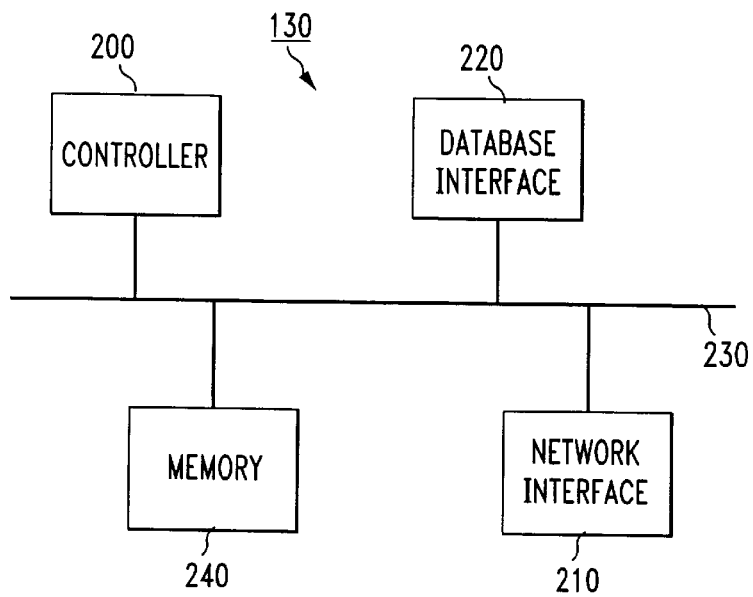
FIG. 2 is an exemplary block diagram of the messaging system of FIG. 1.

FIG. 2 is an exemplary block diagram of the messaging device 130. The messaging device 130 may include a controller 200, a memory 240, a network interface 210, a database interface 220 and a bus 230. The controller 200 controls the operation of the messaging device 130 and communicates with the communication system 120 and the detector 110 through the network interface 210, and the database 140 via its database interface 220. The database interface 220 provides access to the database 140 through which information may pass from the database 140 to the controller 200. Similarly, the network interface 210 provides access to the communication system 120. Through the communication system interface 210, information may pass between the controller 200 and one or more portable devices 100 via the communication system 120. In this exemplary block diagram, the communication system 120 may comprise only a local bus 230 or it may comprise a more elaborate system such as a LAN or WAN.

When the identifier of the portable device 100 is received from the detector 110, via the communication system 120, the controller 200 retrieves message information corresponding to the identifier received from the database 140 through database interface 220. The message information retrieved may include messages of various formats for the person to whom the portable device 100 belongs. Messages may include, for example, voice mail messages, e-mail messages, fax messages, pager messages, text messages and the like. The particular message and/or information that is supplied to the portable device 100 may be dependent on the capabilities of the portable device 100 and may be based on preferences of the user of the portable device 100.

FIG. 3 illustrates an example data structure of the database 140 of FIG. 1. The database 140 can include an identification code 300, user information 310 and various messages such as voice mail messages 320, e-mail messages 330, fax messages 340 and other like messages. When the identification code 300 is received by the messaging device 130 from the portable device 100, the messaging system 10 retrieves messages 320, 330 and 340 based on the identification code 300. The user information 310 can include the user's name, the user's address and other such portable information along with the user's device, device capabilities and user preferences. The user information 310 does not need to be stored on database 140, but may alternatively be stored and modified in the portable device 100 and transmitted with the identification code 300.

Figure 4:
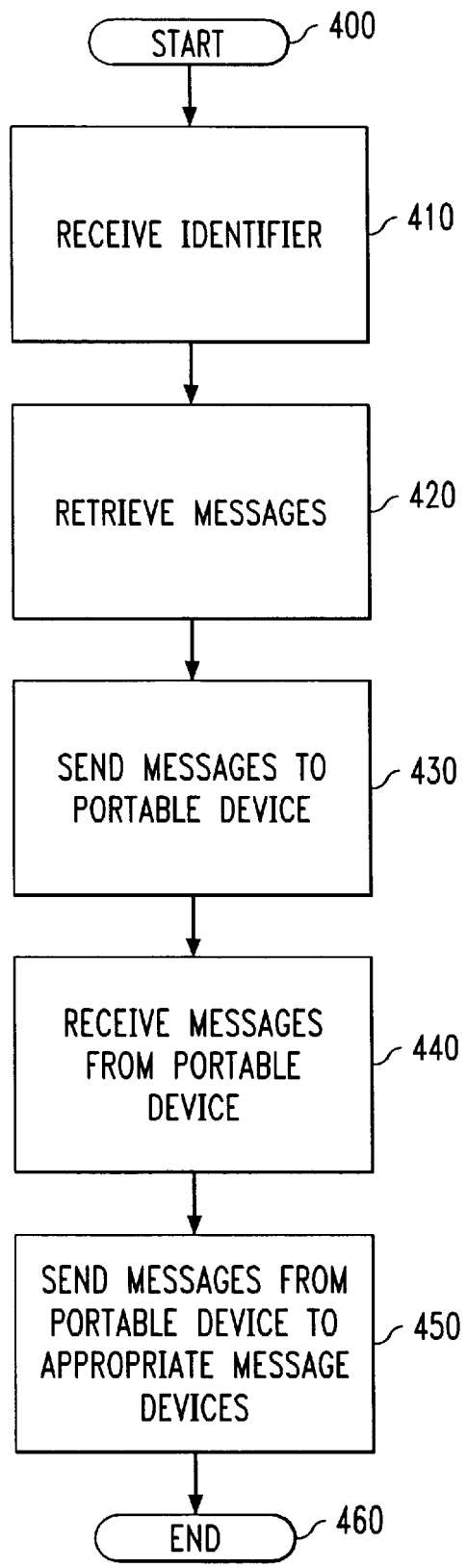
FIG. 4 is an exemplary flowchart outlining the operation of the system of FIG. 1.

FIG. 4 is an exemplary flowchart outlining the operation of one embodiment of the messaging system 10 of FIG. 1. Once the messaging system 10 is initiated in step 400, the messaging system 10 receives identifier information from the portable device 100 in step 410. In step 420, messages are retrieved from the database 140 and/or from other message devices and systems that may communicate with the messaging system 10. In step 430, the retrieved messages are sent to the portable device 100. In step 440, if there are any pending messages on the portable device 100, the messages are received and in step 450 the messages are sent through the communication system 120 to appropriate message devices 130. Steps 420, 430, 440 and 450 only occur if there are messages present on the respective devices. In step 460, the flowchart ends.

Figure 5:
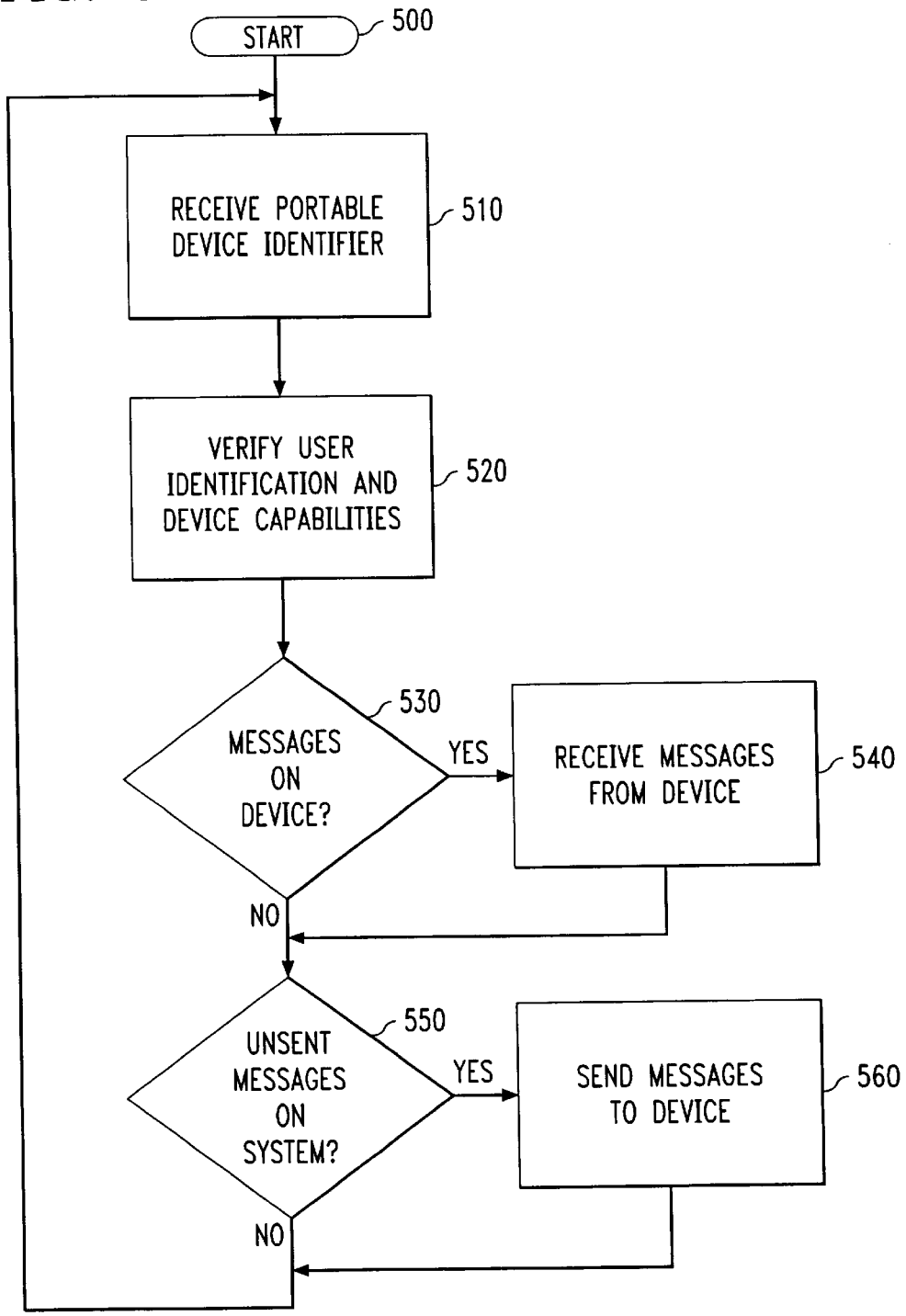
FIG. 5 is an exemplary flowchart of the operation of the messaging system of FIG. 1.

FIG. 5 illustrates a flowchart of an exemplary operation of the messaging device 130. The messaging device 130 is initiated in step 500 and receives a portable device identifier in step 510. Once a portable device identifier is received, the messaging device 130 verifies user ID and device capabilities in step 520. In step 530, the messaging device 130 determines if the user has any messages stored on the portable device 100 to be transmitted to the messaging device 130. If there are pending messages on the portable device 100, the messaging device 130 receives the messages from the portable device 100 in step 540. In step 550, the messaging device 130 then determines if there are unsent messages on the messaging device 130 to send to the portable device 100. If there are unsent messages on the messaging device 130, the messaging device 130 sends the messages to the portable device 100 in step 560. The messaging system can then wait for the next portable device identifier.

The messaging device 130 does not need to wait for the next portable device identifier. The messaging device 130 can continue to communicate with the portable device 100 until the portable device 100 is out of range of the detector 110. While continuing communications with the portable device 100, the messaging device 130 can also attempt to detect the presence of another portable device, for example. If the messaging device 130 continues communication, the messaging device 130 will recognize when there are new messages to receive from the portable device 100 or to send to the portable device 100 and engage in appropriate operations until the portable device 100 is out of range of the detector 110.

Figure 6:
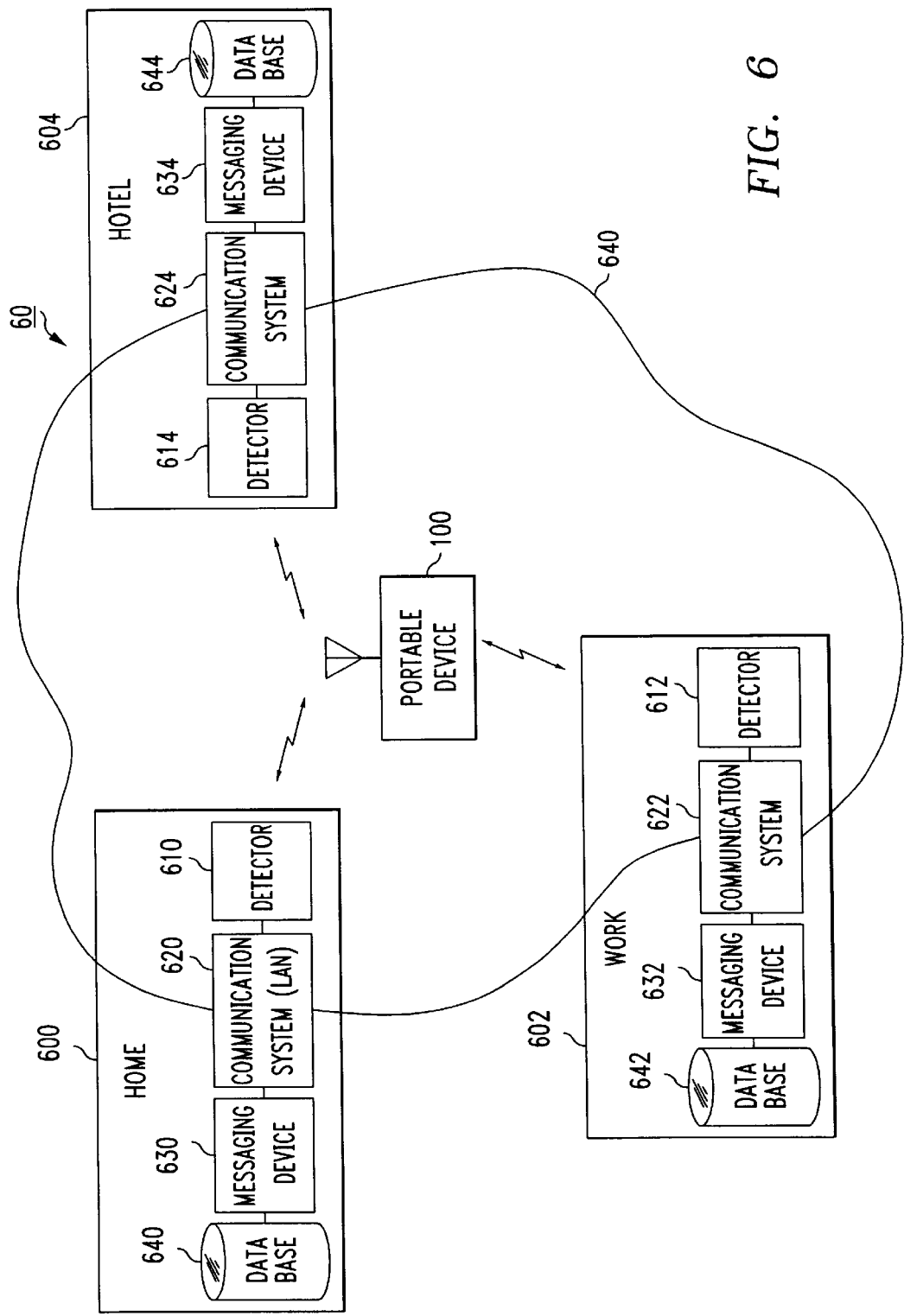
FIG. 6 is an exemplary block diagram of a system according to a second embodiment.

FIG. 6 is an exemplary block diagram of a system 60 according to a second embodiment of the invention. FIG. 6 illustrates the ability of the portable device 100 to communicate with a plurality of messaging systems in various locations, such as at home 600, at work 602 or in a business, such as a hotel 604. Each system at home 600, work 602 and hotel 604 utilizes one or more detectors 610, 612 and 614, communication systems 620, 622 and 624, messaging devices 630, 632 and 634 and databases 640, 642 and 644, respectively. The local communication systems 620, 622 and 624 may be similar to that of communication system 120 in FIG. 1 and may be any form of a local communication system, such as a wired or wireless LAN, WAN or the like.

While the messaging systems at home 600, work 602 and hotel 604 can be stand-alone systems, they can also be connected by a large area communication system 640, such as wide area network, the Internet, or the like. When the messaging systems 600, 602 and 604 are connected via a large area communication system 640, the user can have the option of setting the local systems up to only retrieve messages from the local messaging system or to retrieve messages from selected other messaging systems. For example, the user can set up a home system to retrieve messages sent to both home 600 and work 602. Alternatively, the hotel 604 communication system 624 may be limited to sending only messages received by the hotel messaging device 634 to the portable device 100.

Each messaging system 10 can be configured to automatically collect messages from some, all or none of the other messaging systems 10. The messaging device of each messaging system 10 may send query signals to other messaging systems 10 requesting messages that are stored in the other messaging systems 10 that are destined for the portable device 100. The messaging device may obtain the access information for sending query signals from, for example, profile information stored in correspondence with the portable device identifier. Such profile information may be associated with data such as a phone number, an e-mail account, a social security number, an address, or any other information that can be used as data.

The messaging system 10 in hotel 604 can be of a more transient nature. For example, if the user travels, portable device 100 can temporarily be registered with the messaging system of the hotel 604. Any messages that are sent to the user either at the room, or at the front desk, are then sent to portable device 100 while the user is registered at the hotel 604. The hotel operator or user can then cancel registration of the portable device 100 with the hotel's messaging system when signing out of the hotel 604.

Figure 7:
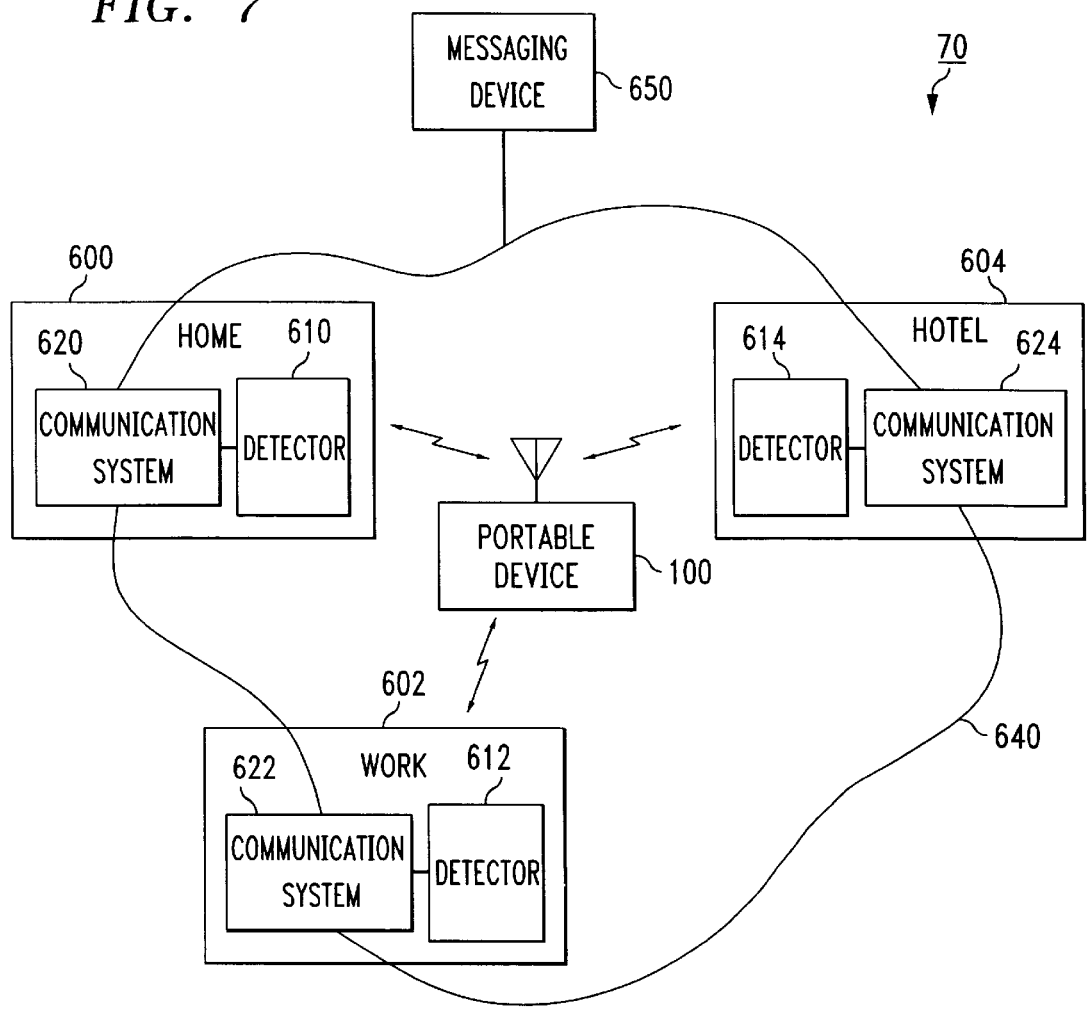
FIG. 7 is an exemplary block diagram of a system according to a third embodiment.

FIG. 7 is an exemplary block diagram of a system 70 according to a third embodiment of the invention. FIG. 7 illustrates network 640 connected to a large area messaging device 650. Local systems at home 600, work 602 and hotel 604 can communicate with the large area messaging device 650 to obtain messages from a large area messaging system service provider. The large area message device 650 performs similar functions as those of the messaging system in FIG. 1. The large area messaging device 650 can also include an integrated database (not shown) similar to database 140. The messaging system service provider may provide messages of a variety of formats that can be used by portable device 100.

Figure 8:
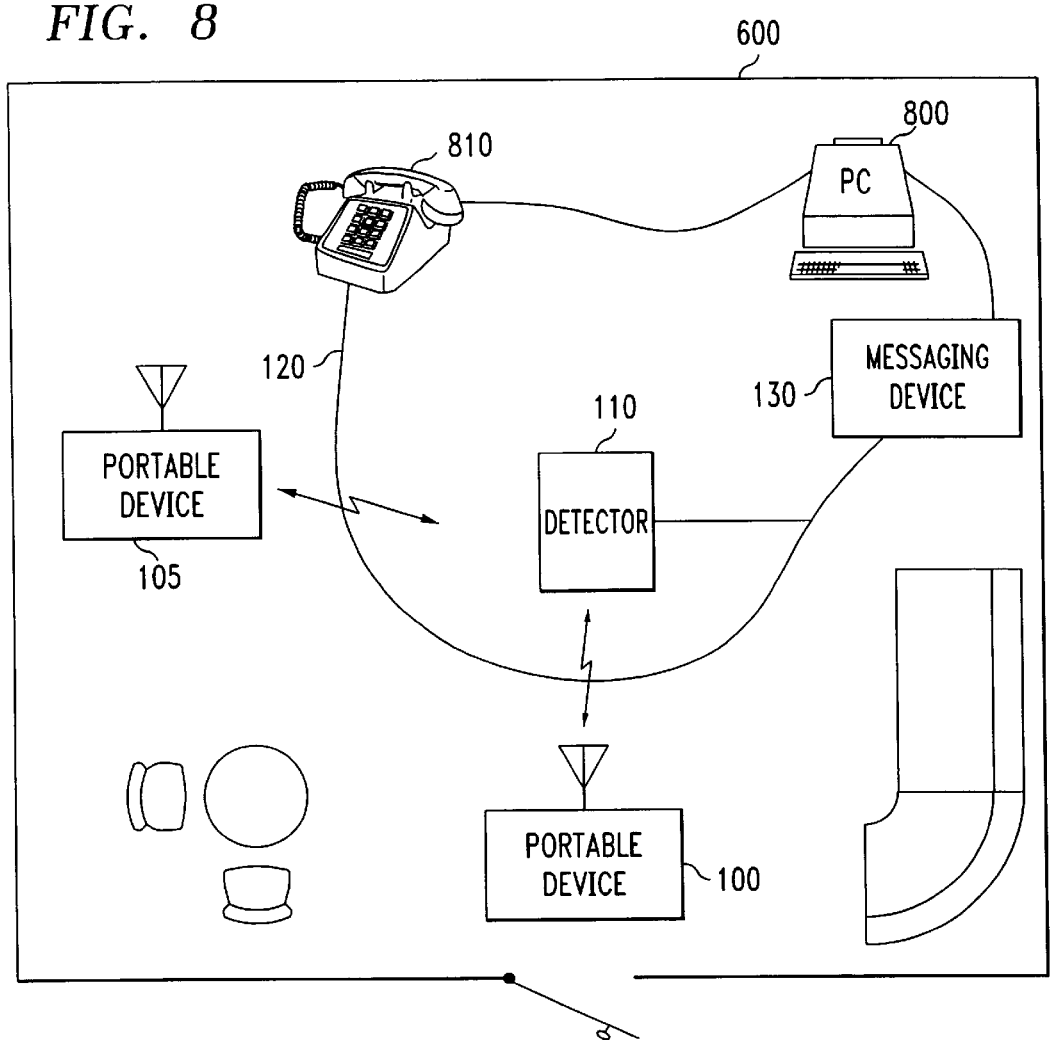
FIG. 8 is an diagram of an exemplary application of the invention.

FIG. 8 is a diagram of an exemplary application of the invention. In the embodiment shown in FIG. 8, the system is in use in a user's home 600. The user's home 600 may have a wired or wireless communication system 120 such as a LAN. The local communication system 120 may be connected to a detector 110 and a messaging device 130 along with a personal computer 800, a phone system 810 or any other communication devices capable of being connected to a local communication system 120. When the user comes home, the user's portable device 100 is detected by the detector 110, authenticated across the communication system 120, and logged on to the messaging device 130. Then, messages of various formats meant for the user are automatically retrieved from a database (not shown) and sent to the portable device 100.

When the user's spouse comes home, the spouse's portable device 105 is logged on and the messages intended for the spouse are sent to the portable device 105. The messaging system can determine the capabilities of the portable devices 100 and 105 from information in a database (not shown) or from information transmitted from the portable devices. The messaging system sends the messages of the type that portable devices 100 and 105 can receive or messages of the type identified by the user's preferences in the database. For example, if the portable device 100 has both audio and text capabilities, both voice mail and e-mail messages may be sent to the portable device 100.

When two users are in close proximity to detector 110, there are various ways that portable devices 110 and 105 may retrieve messages. Personal devices 110 and 105 may be provided with message service on a first-come, first-served basis. The messaging system may also have multiple channels or multiplexing capabilities to communicate with multiple portable devices 100 and 105 simultaneously. The devices 100 and 105 can also be assigned a priority. For example, a parent's portable device can be given priority over a child's portable device. Any method of allowing multiple devices to communicate with the local communication system 120 may be used without departing from spirit and scope of this invention.

Figure 9:
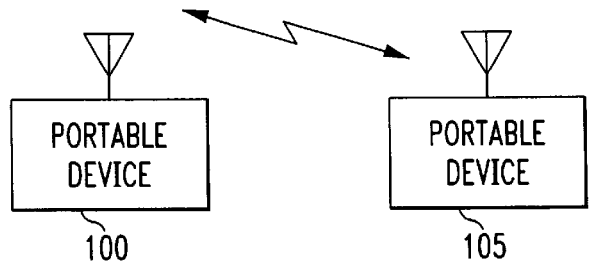
FIG. 9 is a diagram illustrating a communication of information between two portable devices.

FIG. 9 illustrates another example application of the present invention. Multiple portable devices 100 and 105 may have the capability of communicating with each other directly. If there is no detector 110 in close proximity to portable devices 100 and 105, the portable devices 100 and 105 can automatically detect the presence of each other. The portable devices 100 and 105 may have transceivers that send out query signals and monitor for return signals. For example, if the user of portable device 100 has a message in portable device 100 that is intended for the user of portable device 105, the message may be immediately transferred without having to go through a central messaging system.

As described above, the present invention provides for detection of a portable device and receiving and sending of messages to and from the portable device upon detection. The user does not have to access separate messaging systems separately to get separate message formats. Rather, the present invention can compile messages of a variety of message formats and sort the messages to send them to a portable device depending on the capabilities of the portable device and the user's preferences. Additionally, the user does not have to execute lengthy login sequences to obtain personal messages.

The method of this invention is preferably implemented on a programmed processor. However, messaging device 130 can also be implemented on a general purpose or special purpose computer, a programmed microprocessor or microcontroller and peripheral integrated circuit elements, an ASIC or other integrated circuit, a hardware electronic or logic circuit such as a discrete element circuit, a programmable logic device such as a PLD, PLA, FPGA or PAL, or the like. In general, any device on which resides a finite state machine capable of implementing the flowchart shown in FIG. 7 can be used to implement the processor functions of this invention.

While this invention has been described with specific embodiments thereof, it is evident that many alternatives, modifications, and variations will be apparent to those skilled in the art. Accordingly, the preferred embodiments of the invention as set forth herein are intended to be illustrative, not limiting. Various changes may be made without departing from the spirit and scope of the invention.

What is claimed is:

1. A method of delivering messages to a portable device comprising:

selecting a query signal at a controller for broadcasting the query signal to the portable device;

broadcasting the query signal from a detector, the detector being in communications with the controller;

receiving a device identifier at the detector in response to the query signal, the device identifier uniquely identifying the portable device and the capabilities of said portable device; and supplying stored messages to the portable device based on both the device identifier and the capabilities of said portable device.

2. The method of claim 1, wherein the step of supplying stored messages comprises forwarding messages of various formats to the portable device, the messages of various formats including at least one of e-mail, voice-mail, text messages, pager messages and facsimile messages.

3. The method of claim 1, wherein the step of supplying stored messages comprises forwarding messages of various formats to the portable device depending upon at least one of format capabilities of the portable device and user preferences.

4. The method of claim 1, further comprising receiving messages from the portable device and forwarding the messages received from the portable device to a message device.

5. The method of claim 1, further comprising the steps of:
retrieving messages from a plurality of messaging systems; and
forwarding the messages retrieved from the plurality of messaging systems to the portable device.

6. The method of claim 1, wherein the step of receiving the device identifier includes at least one of a user identification that identifies the user of the portable device and a device capability indicator that identifies capabilities of the portable device.

7. The method of claim 1, wherein the step of receiving the device identifier of the portable device includes receiving device identifiers and capabilities of more than one portable device, and forwarding the device identifiers and capabilities to the controller.

8. The method of claim 1, wherein the step of receiving the device identifier comprises,
detecting a reply signal from the portable device, the reply signal including the device identifier and the device capabilities.

9. The method of claim 8, wherein the steps of broadcasting a query signal from the detector and receiving the device identifier and capabilities at the detector are performed using a transceiver that is capable of sending and receiving signals to and from the portable device.

10. The method of claim 1, further comprising the steps of:
storing the messages in at least one messaging system; and
retrieving messages from the messages stored in at least one messaging system.

11. The method of claim 1, wherein the step of receiving the device identifier and capabilities and supplying messages to the portable device are performed automatically.

12. The method of claim 1, wherein the step of supplying stored messages comprises:
accessing a messaging system and based on the device identifier and capabilities, retrieving messages corresponding to the device identifier and capabilities.

13. An apparatus for delivering messages to a portable device comprising:
a controller operative for selecting a query signal;
a detector in communications with the controller and for broadcasting the query signal to the portable device and for receiving a device identifier in response to the query signal that uniquely identifies the portable device and the capabilities of said portable device; and a messaging system that supplies stored messages to the portable device based on the device identifier and the capabilities of said portable device.

14. The apparatus of claim 13, wherein the messaging system forwards stored messages of various formats to the portable device, the various formats including at least one of e-mail, voicemail, text messages, pager messages or facsimile messages.

15. The apparatus of claim 13, wherein the messaging system forwards stored messages of various formats to the portable device depending upon format capabilities of the portable device or user preferences.

16. The apparatus of claim 13, wherein the messaging system receives messages from the portable device and forwards the messages received from the portable device to a message device.

17. The apparatus of claim 13, wherein the detector detects a reply signal from the portable device, the reply signal comprising the device identifier and the capabilities of the device.

18. The apparatus of claim 13, wherein the messaging system retrieves one or more messages from other messaging systems.

19. The apparatus of claim 13, wherein the device identifier comprises at least one of a user identification that identifies the user of the portable device and a device capability indicator that identifies capabilities of the portable device.

20. The apparatus of claim 13, wherein the detector is operative for detecting the presence of more than one portable device.

21. The apparatus of claim 13, further comprising:
a database that stores messages to be sent to the portable device, the database in communications with the controller.

22. The apparatus of claim 13, wherein the detector comprises a transceiver.

23. The apparatus of claim 13, wherein the detector automatically receives the device identifier that uniquely identifies the portable device and the capabilities of the portable device and the messaging system automatically forwards stored messages to the portable device.

24. The apparatus of claim 13, wherein the detector detects a query signal transmitted from the portable device and the detector forwards the query signal to the controller and transmits a reply message to the portable device.

25. A method of delivering messages to a portable device comprising:
selecting a query signal at the portable device;
broadcasting the query signal from the portable device to a detector transceiver, the detector transceiver in communications with the controller;
receiving a device identifier at the detector transceiver in response to the query signal, the device identifier uniquely identifying the portable device and the capabilities of said portable device; and
supplying stored messages to the portable device based on the device identifier and the capabilities of said portable device.

26. The method of claim 25, further comprising the step of transmitting a reply signal to the portable device in response to the query signal.

27. The method of claim 25, wherein the step of receiving the device identifier includes receiving device identifiers and capabilities of more than one portable device, and forwarding the device identifiers and capabilities to the controller.

* * * * *